(12) United States Patent
Liu et al.

(10) Patent No.: US 10,846,101 B2
(45) Date of Patent: Nov. 24, 2020

(54) METHOD AND SYSTEM FOR STARTING UP APPLICATION

(71) Applicant: Alibaba Group Holding Limited, George Town (KY)

(72) Inventors: Zheng Liu, Shanghai (CN); Yongcai Ma, Shanghai (CN); Qinghe Xu, Shanghai (CN); Kerong Shen, Shanghai (CN); Lidi Jiang, Shanghai (CN); Xu Zeng, Shanghai (CN)

(73) Assignee: Alibaba Group Holding Limited

( * ) Notice: Subject to any disclaimer, the term of this patent is extended or adjusted under 35 U.S.C. 154(b) by 105 days.

(21) Appl. No.: 16/130,501

(22) Filed: Sep. 13, 2018

(65) Prior Publication Data

US 2019/0108038 A1    Apr. 11, 2019

Related U.S. Application Data

(63) Continuation-in-part of application No. PCT/CN2017/075449, filed on Mar. 2, 2017.

(30) Foreign Application Priority Data

Mar. 15, 2016    (CN) .......................... 2016 1 0147440

(51) Int. Cl.
*G06F 9/445* (2018.01)
*G06F 9/48* (2006.01)
*G06F 9/455* (2018.01)
*G06F 9/54* (2006.01)

(52) U.S. Cl.
CPC .......... *G06F 9/445* (2013.01); *G06F 9/45529* (2013.01); *G06F 9/45533* (2013.01); *G06F 9/48* (2013.01); *G06F 9/54* (2013.01)

(58) Field of Classification Search
CPC .. G06F 9/445; G06F 9/45529; G06F 9/45533; G06F 9/48; G06F 9/54; G06F 9/4401; G06F 9/4411; G06F 9/44505; G06F 11/1417
USPC .......................................................... 713/1
See application file for complete search history.

(56) References Cited

U.S. PATENT DOCUMENTS

| | | | |
|---|---|---|---|
| 6,405,367 B1 * | 6/2002 | Bryant | G06F 9/44563 717/115 |
| 6,785,721 B1 | 8/2004 | Immerman | |
| 7,770,158 B2 * | 8/2010 | Osborne | G06F 8/51 717/137 |
| 7,779,034 B2 * | 8/2010 | Pedersen | G06F 16/10 707/781 |
| 8,458,612 B2 | 6/2013 | Chatterjee | |
| 8,880,991 B2 * | 11/2014 | Mondal | G06F 16/957 715/205 |

(Continued)

FOREIGN PATENT DOCUMENTS

| | | |
|---|---|---|
| CN | 101222709 | 7/2008 |
| CN | 101610316 | 12/2009 |

(Continued)

*Primary Examiner* — Brian T Misiura
(74) *Attorney, Agent, or Firm* — Van Pelt, Yi & James LLP

(57) ABSTRACT

Starting up an application is disclosed including prior to launching an application, executing startup processing associated with the application using a parent process; in response to receiving a startup command for the application, creating a child process using the parent process; and launching the application using the child process.

9 Claims, 10 Drawing Sheets

(56) References Cited

U.S. PATENT DOCUMENTS

| | | | |
|---|---|---|---|
| 9,189,252 B2* | 11/2015 | Chu | G06F 9/445 |
| 9,578,032 B2* | 2/2017 | Beveridge | G06F 9/45558 |
| 9,626,212 B2* | 4/2017 | Beveridge | G06F 16/273 |
| 2012/0167122 A1 | 6/2012 | Koskimies | |
| 2012/0324481 A1* | 12/2012 | Xia | G06F 9/485 |
| | | | 719/320 |
| 2014/0229951 A1 | 8/2014 | Zhang | |
| 2016/0055017 A1* | 2/2016 | Beveridge | G06F 9/45558 |
| | | | 718/1 |
| 2016/0321116 A1* | 11/2016 | Schwartz, Jr. | G06F 9/5011 |

FOREIGN PATENT DOCUMENTS

| | | |
|---|---|---|
| CN | 101639787 | 2/2010 |
| CN | 103631612 | 3/2014 |

* cited by examiner

100

200

300

3100

400

4100

METHOD AND SYSTEM FOR STARTING UP APPLICATION

CROSS REFERENCE TO OTHER APPLICATIONS

This application is a continuation-in-part of and claims priority to International (PCT) Application No. PCT/CN2017/75449, entitled APPLICATION STARTING METHOD AND APPARATUS, AND SMART TERMINAL, filed Mar. 2, 2017 which is incorporated herein by reference for all purposes, which claims priority to China Application No. 201610147440.9 entitled AN APPLICATION STARTUP METHOD, DEVICE, AND SMART TERMINAL, filed Mar. 15, 2016 which is incorporated herein by reference for all purposes.

FIELD OF THE INVENTION

The present application involves a method and a system for starting up an application.

BACKGROUND OF THE INVENTION

Because the JavaScript language has strong community support, and simultaneously possesses dynamic update capabilities, the JavaScript language is widely used in various types of applications (apps) including games. At the same time, industry players have introduced frameworks and engines that use JavaScript as an interface, such as unity3d-js, cocos2d-js, React.js, and React Native, to allow developers to write applications using these frameworks and engines.

A framework or an engine typically executes startup operations required for an application after a user startup command for the application is received. However, because JavaScript is a dynamic language, a JavaScript virtual machine utilizes an interpreter or a just-in-time compiler, which comes at the price of execution speed and start-up time.

Additionally, in order to increase operating efficiency, some frameworks or engines use a native language (also referred to as host language or native code) to program a portion of an application's functional modules. In other words, binding relationships are to be established between the JavaScript interface and the native functional modules during the application startup process. However, the process of establishing the binding relationships increases time for the application startup process.

SUMMARY OF THE INVENTION

The embodiments of the present application disclose processes for increasing application startup speed.

Correspondingly, the embodiments of the present application further disclose an application startup device and a computer program product for increasing application startup speed.

The present application discloses an application startup method, comprising:
 before starting up an application, executing startup processing associated with the application using a parent process;
 in response to receiving a startup command for the application, creating a child process using the parent process;
 the child process can be used to launch the application.

In some embodiments, the executing of the startup processing associated with the application comprises:
 executing startup processing of functional modules associated with the application using the parent process.

In some embodiments, the executing of the startup processing associated with the application comprises:
 executing a system application programming interface (API) associated with the application, libraries associated with the application, or both using the parent process.

In some embodiments, the executing of the startup processing associated with the application comprises:
 establishing a binding relationship between a JavaScript interface and native functional modules associated with the application using the parent process.

In some embodiments, the executing of the startup processing associated with the application comprises:
 launching a virtual machine in the parent process;
 compiling target JavaScript code associated with the application in the virtual machine to obtain corresponding compilation results.

In some embodiments, the compiling of the target JavaScript code associated with the application in the virtual machine comprises:
 analyzing the target JavaScript code associated with the application in the virtual machine to obtain a corresponding syntax tree;
 compiling the syntax tree to obtain commands that a smart terminal can recognize.

In some embodiments, the creating of the child process comprises:
 in response to receiving a startup command for the application, running a fork function to obtain a child process corresponding to the parent process using the parent process.

In some embodiments, the parent process corresponds to multiple child processes, where the startup processing associated with the application comprises: startup processing jointly associated with multiple applications corresponding to the multiple child processes.

As an aspect, the present application further discloses an application startup device, comprising:
 an execution module configured to, before startup of an application, execute startup processing associated with the application using a parent process;
 in response to receiving a startup command for the application, a creating module configured to create a child process using the parent process; and
 a launching module configured to launch the application based on the child process.

In some embodiments, the execution module further comprises:
 a first executing submodule configured to execute startup processing of functional modules associated with the application using the parent process.

In some embodiments, the execution module further comprises:
 a second executing submodule configured to execute system APIs associated with the application, libraries associated with the application, or both using the parent process.

In some embodiments, the execution module comprises:
 a third executing submodule configured to establish a binding relationship between a JavaScript interface and native functional modules associated with the application using the parent process.

In some embodiments, the execution module comprises:
 a launching submodule configured to launch a virtual machine in the parent process; and a compiling submodule configured to compile the target JavaScript code associated with the application to obtain corresponding compilation results.

In some embodiments, the compiling submodule comprises:

a syntax tree generating module configured to analyze target JavaScript code associated with the application in the virtual machine to obtain a corresponding syntax tree; and a command generating module configured to compile the syntax tree to obtain commands that a smart terminal can recognize.

As an aspect, the present application further discloses a computer program product being embodied in a tangible non-transitory computer readable storage medium and comprising computer instructions for:

before startup of an application, executing startup processing associated with the application using a parent process;

in response to receiving a startup command for the application, creating a child process using the parent process; and launch the application based on the child process.

Compared to conventional techniques, the embodiments of the present application include at least the following advantages:

In some embodiments, launching a parent process in advance before the startup of an application, and executing startup processing associated with the application using the parent process are performed; and furthermore, in response to receiving a startup command for the application, creating a child process using the parent process, and launching the application based on the child process, the child process being a copy of the parent process; after the child process is created, the code segments, data segments, stacks, and other process execution information of the parent process can be copied into the space of the child process; and the process execution information of the parent process can include the startup processing results associated with the application; in this way, relative to the conventional techniques, because the present application completes the startup processing associated with the application using the parent process before the startup of the application, and the startup processing is a portion of the operations used to launch the application, reducing the operations to be performed for the child process, thereby increasing the startup speed of the application, is performed.

BRIEF DESCRIPTION OF THE DRAWINGS

Various embodiments of the invention are disclosed in the following detailed description and the accompanying drawings.

DETAILED DESCRIPTION

Figure 1:
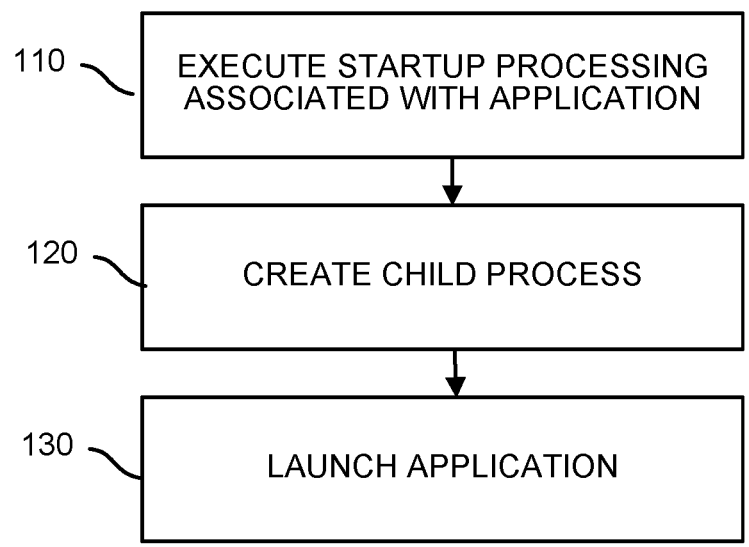
FIG. 1 is a flowchart of an embodiment of a process for starting up an application.

The invention can be implemented in numerous ways, including as a process; an apparatus; a system; a composition of matter; a computer program product embodied on a computer readable storage medium; and/or a processor, such as a processor configured to execute instructions stored on and/or provided by a memory coupled to the processor. In this specification, these implementations, or any other form that the invention may take, may be referred to as techniques. In general, the order of the steps of disclosed processes may be altered within the scope of the invention. Unless stated otherwise, a component such as a processor or a memory described as being configured to perform a task may be implemented as a general component that is temporarily configured to perform the task at a given time or a specific component that is manufactured to perform the task. As used herein, the term 'processor' refers to one or more devices, circuits, and/or processing cores configured to process data, such as computer program instructions.

A detailed description of one or more embodiments of the invention is provided below along with accompanying figures that illustrate the principles of the invention. The invention is described in connection with such embodiments, but the invention is not limited to any embodiment. The scope of the invention is limited only by the claims and the invention encompasses numerous alternatives, modifications and equivalents. Numerous specific details are set forth in the following description in order to provide a thorough understanding of the invention. These details are provided for the purpose of example and the invention may be practiced according to the claims without some or all of these specific details. For the purpose of clarity, technical material that is known in the technical fields related to the invention has not been described in detail so that the invention is not unnecessarily obscured.

One of the benefits of embodiments of the present application relates to launching in advance of a parent process or an application spawning process before starting up an application, and executing the startup processing associated with the application using the parent process; and furthermore, in response to receiving a startup command for the application, creating a child process or an application process using the parent process, and launching the application using the child process. In some embodiments, the parent process corresponds to a preloading process. In some embodiments, the child process corresponds to a process spawned by the parent process.

As will be discussed in greater detail below, in some embodiments, the parent process is a startup process configured to perform startup operations, and is different from the application process itself.

Furthermore, the framework or engine can spawn an initial spawning process before an application start-up command is executed, e.g., at operating system start-up. Therefore, the spawning process can perform some start-up computation before the actual application start-up, and thus accelerate the application startup Because the child process is a copy of the parent process, after the child process is created, code segments, data segments, stacks, and other process execution information of the parent process can be copied into the space of the child process, and the process execution information of the parent process can include startup processing results associated with the application. In this way, relative to conventional techniques, because the embodiments of the present application complete the startup processing associated with the application using a parent process before the startup of the application, and because the startup processing is a portion of the operations to be performed for the application to start, the embodiments of the present application reduce the operations to be performed for the child process, thereby increasing the startup speed of the application.

The process for starting up an application included in the embodiments of the present application can be applied in smart terminal operating systems. For example, the process is applied in frameworks and engines for JavaScript interfaces in the smart terminal operating systems. In an example, the smart terminal operating systems launch applications on a smart terminal first when the smart terminal is powered on, and before an application is launched on the smart terminal, the smart terminal operating systems can execute the startup processing associated with the application using a parent process; and after receiving a startup command for the application from a user or another application, create a child process using the parent process, and launch the application using the child process.

As an example, the operating systems include: Android™, IOS™, YunOS™ Linux™, Windows™, etc. As another example, the smart terminals include: smart phones, tablets, e-readers, MP3 (Moving Picture Experts Group Audio Layer III) players, MP4 (Moving Picture Experts Group Audio Layer IV) players, laptop portable computers, onboard computers, desktop computers, set-top boxes, smart TVs, wearable devices, etc.

For example, before a WeChat™ application is started up in a smart terminal, the operating system executes the startup processing of functional modules associated with the WeChat application (such as the communication module, the graphics module, etc.) using a parent process; then, after receiving a startup command for the WeChat application from the user, the operating system creates a child process using the parent process, and the operating system launches the WeChat application using the child process. Because the startup processing of the functional modules associated with the WeChat application has been executed in advance in the parent process, the performing of the startup processing in advance reduces the operations to be performed for the child process to start up the application, thereby increasing the startup speed of the application.

FIG. 1 is a flowchart of an embodiment of a process for starting up an application. In some embodiments, the process 100 is implemented by an operating system of a device 400 of FIG. 4A and comprises:

In 110, before starting up an application, the operating system executes startup processing associated with the application using a parent process.

In some embodiments, the startup processing associated with the application corresponds to any startup processing that supports execution in advance. Regarding the startup processing associated with the application, because the startup processing can be executed before the startup of the application, typically, the startup processing can be unrelated to the source code of the application, and in this way, the startup processing can provide better assurance of the security of the application source code. Of course, one skilled in the art can also obtain the application source code through agreement or cooperation, thus, the startup processing associated with the application can also be related to the application source code. As an aspect, the embodiments of the present application do not limit the startup processing associated with the application.

In addition, it must be noted that the startup processing associated with the application can be associated with one application, or the startup processing can be associated with multiple applications. For example, many applications including the WeChat application, the Alipay application, the QQ application, browser applications, etc., all require internet functionality and graphics functionality. Therefore, the startup processing of functional modules corresponding to internet functionality and graphics functionality can be associated with multiple applications. In some embodiments, the startup processing includes loading and initializing a communication module used to provide communication/internet functionality, a graphics module used to provide graphics functionality, and/or other functional modules.

The embodiments of the present application can provide the following technical solutions using the parent process to execute the startup processing associated with the application:

In a first example, the executing of the startup processing associated with the application includes:

executing the startup processing of functional modules associated with the application using the parent process.

In some embodiments, the functional modules are modules used to implement the application operating environment. For example, the application operating environment includes the network environment, the graphics environment, etc. Therefore, the corresponding functional modules can specifically include a communication module and a graphics module. In some embodiments, the graphics module further includes: a graphical user interface (GUI) module, a rendering module, etc.

In some embodiments, the functional modules also include modules used to implement application functions.

In some examples, for applications for which the startup speed is to be increased, the associated functional modules can be determined in advance. In some embodiments, the corresponding determining technique includes: such techniques as analyzing the application or cooperating with the developers of the application to determine the associated functional modules.

In a second example, the executing of the startup processing associated with the application includes:

executing system APIs associated with the application, loading libraries associated with the application, or both using the parent process.

In some embodiments, the system APIs are functions provided by the operating system of the device to facilitate user design of application programs, and are used to implement certain specific functions. Because the system APIs can be independent from the application, the parent process can be used to execute the system APIs associated with the application in advance.

The system APIs can be loaded into memory, can be executed, or both. For example, applications often query various system capabilities and information at startup time, and the querying involves communication with several processes, which include, for example, operations like accessing databases, which can be time consuming, and querying kernel and device drivers. For a given device or system, most of the queried information is static after the system has booted up, and the system APIs can be executed and loaded for the application spawning process.

Libraries refer to a technique of placing functions in libraries to make the functions available for use. The libraries can include: a class library, a standards library, a dynamic link library, etc. In some embodiments, the class library is a comprehensive set of object-oriented, reusable classes. The classes can include: interfaces, abstract classes, concrete classes, etc. Because libraries are typically language-related and can be independent from applications, the parent process can therefore be used to execute libraries associated with the application in advance. In some embodiments, shared libraries often are to be initialized before usage. Therefore, the shared libraries are both loaded and executed (initialized). In addition, for some libraries, a spawning process can invoke certain APIs to preload a resource or perform some computation.

In some embodiments, the execution of the startup operation includes: invoking or loading the application.

In one example, for applications for which the startup speed is to be increased, the associated system API, libraries, or both can be determined in advance. In some embodiments, the determining operation includes: techniques for analyzing the application or cooperating with the developers of the application.

In another example, before the Alipay application is launched in a smart terminal, the operating system can execute, using a parent process, the startup processing of the related system APIs, libraries (such as frequently-used class libraries, standards libraries, etc.), or both associated with the Alipay application. Subsequently, after a startup command for the application is received from the user, the operating system can create a child process using the parent process, and the child process can be used to launch the Alipay application. Because the startup processing of the system APIs associated with the Alipay application, libraries associated with the Alipay application, or both have been executed in advance in the parent process, this reduces the operations necessary for the child process, thereby increasing the startup speed of the application.

In a third example, the executing of the startup processing associated with the application includes:

establishing a binding relationship between JavaScript interfaces and native functional modules associated with the application using the parent process.

Using a PowerManager system module as an example of a binding relationship, the operating system has a native implementation of the PowerManager system module in the form of native language or interprocess communication (IPC). For JavaScript to use the PowerManager system module, a set JavaScript objects for the PowerManager system module, e.g. a global PowerManager object instance and several JavaScript functions as APIs are to exist. These JavaScript objects and functions are created using native code, which call native APIs of the JavaScript virtual machine to create corresponding JavaScript objects and functions, and implement the functions of: converting JavaScript values to native values, calling native APIs of the PowerManager, and converting native return values back to JavaScript. The creation of the JavaScript objects and functions for the corresponding system APIs costs start-up time, and can be moved ahead to the spawning process.

The technique of the third example can be applied to target applications for which a native code has been used to write a portion of the functional modules. The conventional techniques typically establish a binding relationship between the JavaScript interface and the native functional modules during the startup process of the target application.

Before the startup of the target application, the technique of the third example can establish the binding relationship between the JavaScript interface and the native functional modules associated with the target application using a parent process, thus reducing the time wasted by the technique for establishing the binding relationship in the application startup process, and thereby increasing the startup speed of the target application.

As an example, the relevant information for the JavaScript interface and the native functional modules associated with the target application can be determined in advance, and in this way, the startup process of the application can include the establishing of the corresponding binding relationship based on the relevant information.

In another example, assume that a target application has used the native language to program a portion of the functional modules. Before the target application is launched in a smart terminal, the operating system can establish a binding relationship between the JavaScript interface and the native functional modules associated with the target application using a parent process. Furthermore, after a startup command for the target application is received from the user, the operating system creates a child process using the parent process, and the operating system launches the target application using the child process. Because the binding relationship between the JavaScript interface and the native functional modules associated with the application has been established in advance in the parent process, the technique reduces the operations to be performed by the child process, thereby increasing the startup speed of the application.

In a fourth example, the executing of the startup processing associated with the application using the parent process includes:

compiling target JavaScript code associated with the application in the virtual machine to obtain the corresponding compilation results.

The fourth example can apply to applications programmed using the JavaScript language. Because the target JavaScript code associated with the application can be compiled in advance in the virtual machine of the parent process to allow the child process to execute the compilation results directly, and because these applications reduce the operations to compile the target JavaScript code performed by the child process to launch the application, these applications increase the startup speed of the application.

As an example, the target JavaScript code includes JavaScript code to be executed to launch the application. For example, the JavaScript code includes: JavaScript code corresponding to the startup processing in any of the above first through third examples. In another example, the target JavaScript code includes: the code of functional modules programmed using the JavaScript language.

In some embodiments, in the above compiling of the target JavaScript code, a JavaScript code function, a function included in a JavaScript code object, or both can be executed to obtain compilation results in the form of native machine code to enable the child process to execute the compilation results directly. Relative to conventional line-by-line interpretation techniques, the execution speed of the application can be greatly increased.

In some embodiments, the compiling of the target JavaScript code associated with the application in the virtual machine includes: first, analyzing the target JavaScript code associated with the application in the virtual machine to obtain a corresponding syntax tree; and then, compiling the syntax tree to obtain commands that the smart terminal can recognize. In some embodiments, parsing techniques are used to perform the analysis to generate the corresponding syntax tree. In addition, the compilation process for the syntax tree can be an optional process, and the child process can perform the syntax tree compilation instead of the parent process.

In some embodiments, to ensure that the target JavaScript code is fully compiled and optimized, and thereby increase the startup speed of the application, the compiling of the target JavaScript code associated with the application in the virtual machine includes:

invoking a relevant function of the virtual machine to analyze the target JavaScript code associated with said application; and executing warm-up code that can invoke key JavaScript functions to obtain commands that the smart terminal can recognize.

JavaScript virtual machines typically use a layered just in time (JIT) design. In other words, JavaScript virtual machines (VMs) parse and compile JavaScript code "lazily" or avoid parsing and compiling code unless the code is to be executed or considered hot. A VM executes cold code (e.g. JavaScript functions that are to be executed for the first time) with a baseline (unoptimized) JIT compilation or bytecode interpreter. The VM is not to perform optimized JIT compilation until the VM considers that the code is hot (e.g., the code is runs for N times where N is greater than 1). Therefore, to confirm that the JavaScript code (loop or function) is well compiled (optimized), the function is to be run a sufficient number of times (based on knowledge of the VM internals) or warmed-up.

Because the warm-up code can invoke key JavaScript functions based on the characteristics executed by JavaScript runtime, key JavaScript functions are ensured to be fully compiled. In other words, JavaScript has a large API surface, and therefore many JavaScript Virtual Machine (VM) internal functional and JavaScript library APIs are implemented by JavaScript, internal VM abstract syntax tree (AST), or internal routines (IR). This means that quite a few of the JavaScript internal routines/library functions have the same performance characteristic with regular user JavaScript code—they are slow to execute for the first few times (not parsed/compiled until ever run; not optimized until run several times). Moreover, the warm-up code does not need to affect the execution results of the target JavaScript code. It is understood that all JavaScript functions that can play a key role are within the scope of protection for key JavaScript functions.

The examples of the parent process to execute the startup processing associated with the application have been described in detail above using the first example through the fourth example. It is understood, based on actual application needs, persons skilled in the art can employ any one or a combination of the first example through the fourth example, or the persons can execute the startup processing associated with the application based on other technical solutions that use the parent process. Process 100 completes the startup processing associated with the application in advance using a parent process before the application is launched.

In 120, in response to receiving a startup command for the application, the operating system creates a child process using the parent process.

In 130, the operating system launches the application using the child process.

In some embodiments, the child process serves as a process of the application, and because the child process is a copy of the parent process, after the child process is created, the data segments, code segments, stacks, and other process execution information of the parent process are copied to the space of the child process. In addition, the process execution information of the parent process can include the results of the startup processing associated with the application. Therefore, the space of the child process can also include the results of the startup processing, thus the operations to be performed by the child process are reduced, and the startup speed of the application is increased.

In some embodiments, relating to the Linux kernel operating system, in 120, the creating of the child process using the parent process includes:

in response to receiving a startup command for the application, running, using the parent process, a fork function to obtain a child function.

In some embodiments, in the Windows operating system, the CreateProcess ( ) function is executed by a parent process to obtain a child process. In some embodiments, BOOL bInheritHandles of the CreateProcess ( ) function is used to indicate whether the properties of the parent process are to be inherited.

In some embodiments, the parent process corresponds to multiple child processes, in which case the startup processing associated with the application includes: startup processing jointly associated with multiple applications corresponding to the multiple child processes. For example, the parent process corresponds to three child processes for three applications, including the WeChat application, the Alipay application, and a browser application. In this case, the startup processing associated with the application includes: startup processing jointly associated with the three applications. The aforementioned technique of using one parent process to correspond to multiple child processes can also conserve system resources.

In summary, in some embodiments, before the starting up of an application, the operating system can complete the startup processing associated with the application using a parent process, and in response to receiving a startup command for the application, the operating system creates a child process using the parent process, and the operating system launches the application using the child process. Because the child process is a copy of the parent process, after the child process is created, the operating system copies data segments, code segments, stacks, and other process execution information of the parent process to the space of the child process. In some embodiments, the process execution information of the parent process includes the results of the startup processing associated with the application. In this way, relative to conventional techniques, the number of operations to be executed by the child process to launch the application is reduced, thereby increasing the startup speed of the application.

Figure 2A:
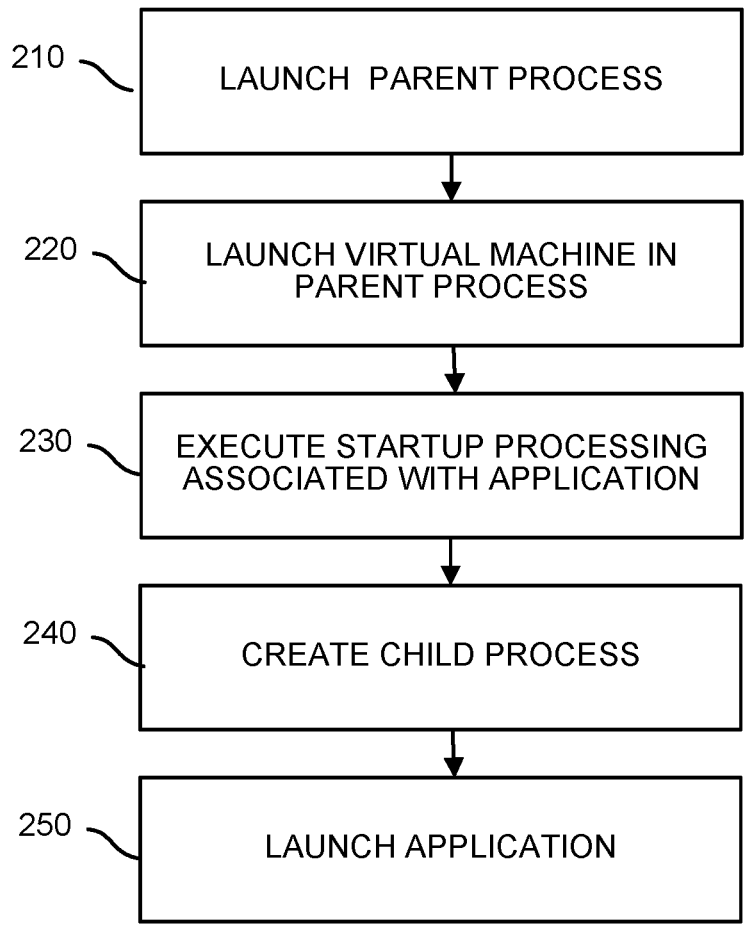
FIG. 2A is a flowchart of another embodiment of a process for starting up an application.

FIG. 2A is a flowchart of another embodiment of a process for starting up an application. In some embodiments, the process 200 is implemented by an operating system of a device 400 of FIG. 4A and comprises:

In 210, the operating system launches a parent process.

In 220, the operating system launches a virtual machine in the parent process.

In some embodiments, the virtual machine serves as an execution environment for JavaScript code.

In 230, before the starting up of the application, the operating system executes startup processing associated with the application using the parent process.

Figure 2B:
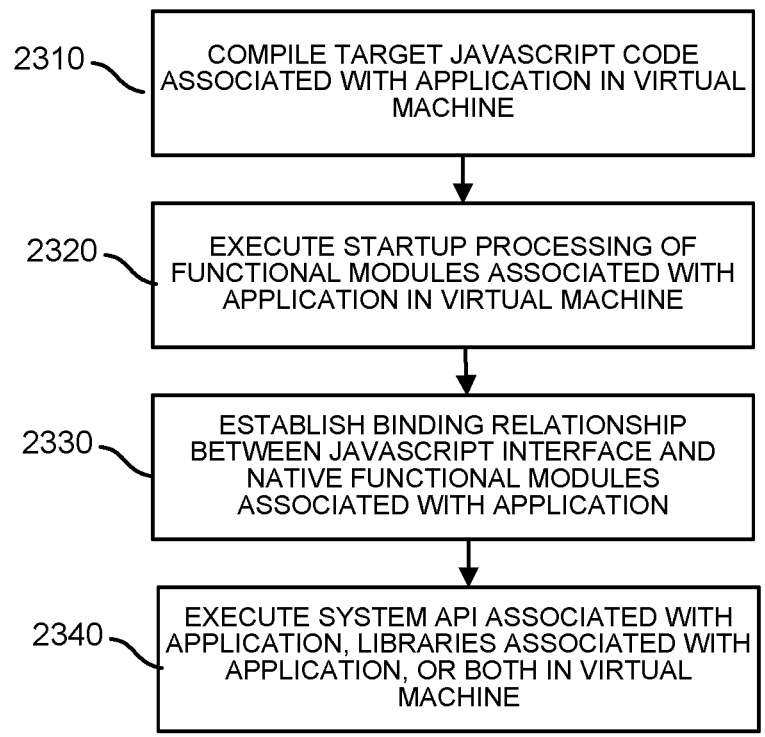
FIG. 2B is a flowchart of an embodiment of a process for executing startup processing.

FIG. 2B is a flowchart of an embodiment of a process for executing startup processing. In some embodiments, the process 2300 is an implementation of operation 230 of FIG. 2A and includes:

In 2310, the operating system compiles target JavaScript code associated with the application in the virtual machine to obtain corresponding compilation results.

In 2320, the operating system executes startup processing of functional modules associated with the application in the virtual machine.

In 2330, the operating system establishes a binding relationship between a JavaScript interface and native functional modules associated with the application in the virtual machine. The native functional modules are written in a native language.

In 2340, the operating system executes system APIs associated with the application, libraries associated with the application, or both in the virtual machine.

Referring back to FIG. 2A, in 240, in response to receiving a startup command for the application, the operating system creates a child process using the parent process. In some embodiments, the child process serves as an application process of the application.

In some embodiments, in operation 240, after receiving a startup command for the application, the operating system creates an application process for the current application. In some embodiments, when multiple application startup commands are received, the operating system creates multiple corresponding application processes. The process of using one parent process that corresponds to multiple child processes of multiple applications can conserve system resources.

In 250, the operating system launches the application based on the application process.

Figure 3A:
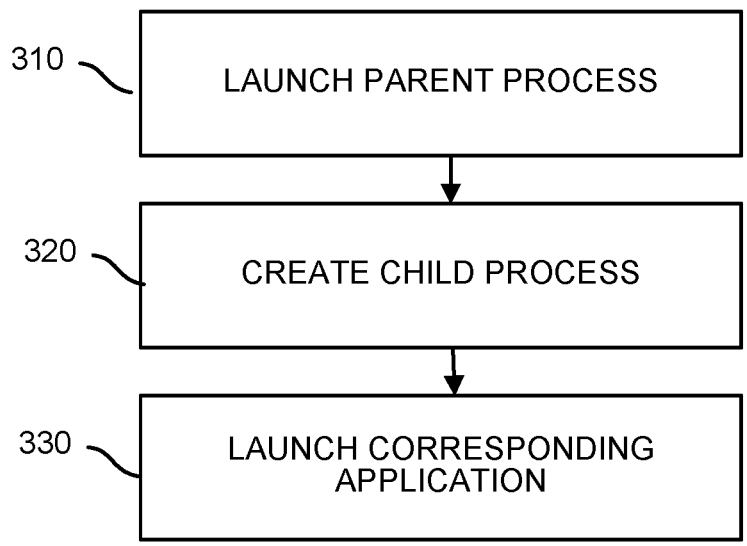
FIG. 3A is a flowchart of yet another embodiment of a process for starting up an application.

FIG. 3A is a flowchart of yet another embodiment of a process for starting up an application. In some embodiments, the process 300 is implemented by an operating system of a device 400 of FIG. 4A and comprises:

In 310, the operating system launches a parent process.

Figure 3B:
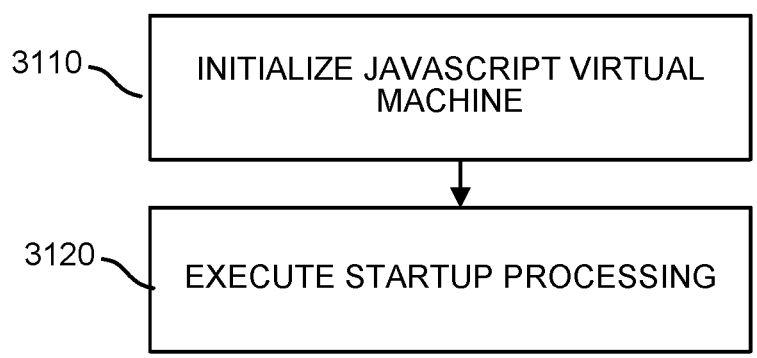
FIG. 3B is a flowchart of an embodiment of a process for launching a parent process.

FIG. 3B is a flowchart of an embodiment of a process for launching a parent process. In some embodiments, the process 3100 is an implementation of operation 310 of FIG. 3A and includes:

In 3110, the operating system initializes a JavaScript virtual machine (VM) in a parent process.

In 3120, the operating system executes startup processing associated with an application based on the VM.

Figure 3C:
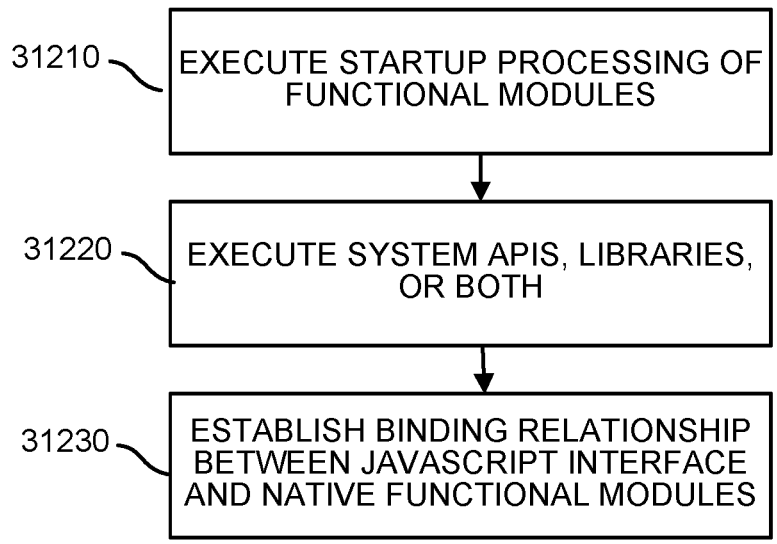
FIG. 3C is a flowchart of an embodiment of a process for executing startup processing.

FIG. 3C is a flowchart of an embodiment of a process for executing startup processing. In some embodiments, the process 31200 is an implementation of operation 3120 of FIG. 3B and includes:

In 31210, the operating system executes startup processing of functional modules associated with the application based on a VM.

In 31220, the operating system executes system APIs associated with the application, libraries associated with the application, or both based on the VM.

In 31230, the operating system establishes a binding relationship between JavaScript interfaces (or APIs) and native functional modules associated with the application based on the parent process.

Referring back to FIG. 3A, in 320, in response to receiving a startup command for the application, the operating system creates, using the parent process, a child process to serve as an application process corresponding to the application.

For example, after receiving the startup command, an application process corresponding to the startup command is created. In other words, the number of application processes can be one or more.

In 330, the operating system launches a corresponding application based on the application process.

Figure 4A:
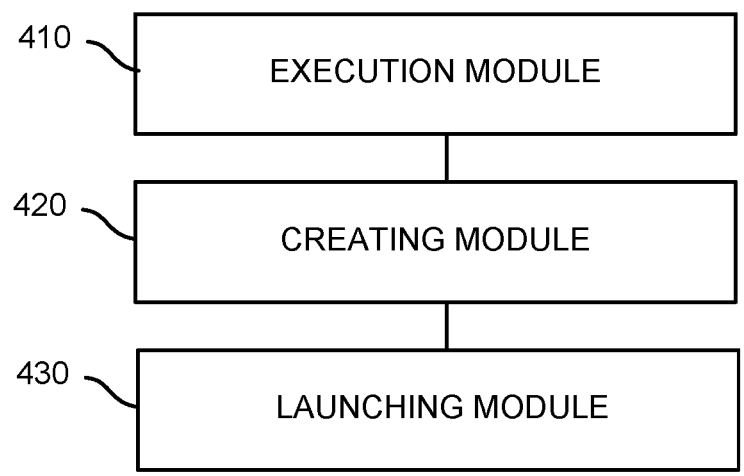
FIG. 4A is a structural block diagram of an embodiment of a device for starting up an application.

FIG. 4A is a structural block diagram of an embodiment of a device for starting up an application. In some embodiments, the device 400 includes the following: an execution module 410, a creating module 420, and a launching module 430.

In some embodiments, before starting up an application, the execution module 410 is configured to execute startup processing associated with the application using a parent process.

In some embodiments, in response to receiving a startup command for the application, the creating module 420 is configured to create a child process using the parent process.

In some embodiments, the launching module 430 is configured to launch the application using the child process.

In some embodiments, the execution module 410 is configured to execute, using the parent process, a startup processing of functional modules associated with the application.

In some embodiments, the execution module 410 is configured to execute, using the parent process, the system APIs associated with the application, libraries associated with the application, or both.

In some embodiments, the execution module 410 is configured to establish, based on the parent process, a binding relationship between a JavaScript interface and native functional modules associated with the application.

Figure 4B:
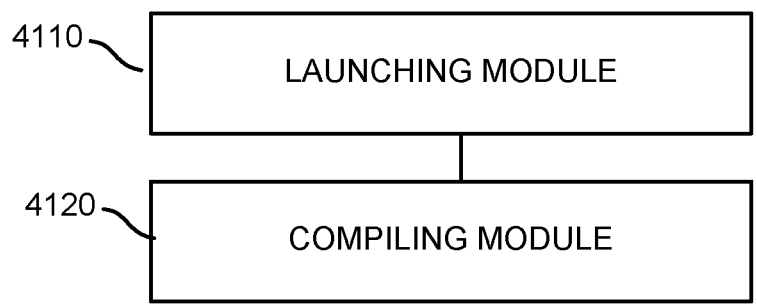
FIG. 4B is a structural block diagram of an embodiment of an execution module.

FIG. 4B is a structural block diagram of an embodiment of an execution module. In some embodiments, the execution module 4100 is an implementation of the execution module 410 of FIG. 4A and comprises: a launching module 4110 and a compiling module 4120.

In some embodiments, the launching module 4110 is configured to launch a virtual machine in the parent process.

In some embodiments, the compiling module 4120 is configured to compile target JavaScript code associated with the application in the virtual machine to obtain corresponding compilation results.

Figure 4C:
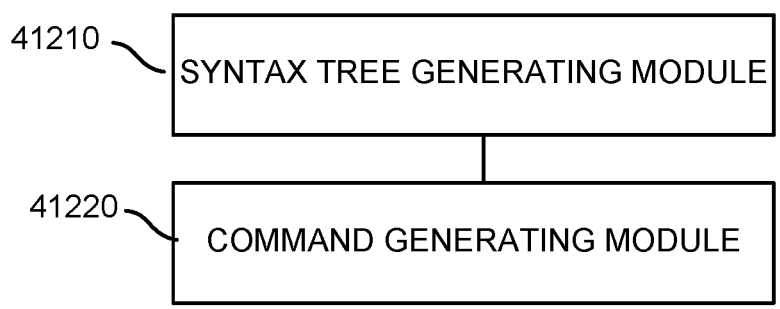
FIG. 4C is a structural block diagram of an embodiment of a compiling module.

FIG. 4C is a structural block diagram of an embodiment of a compiling module. In some embodiments, the compiling module 41200 is an implementation of the compiling module 4120 of FIG. 4B and comprises: a syntax tree generating module 41210 and a command generating module 41220.

In some embodiments, the syntax tree generating module 41210 is configured to analyze target JavaScript code associated with the application in the virtual machine to obtain a syntax tree.

In some embodiments, the command generating module 41220 is configured to compile the syntax tree to obtain commands that a smart terminal can recognize.

Referring back to FIG. 4A, in response to receiving a startup command for the application, the creating module 420 is further configured to run, using the parent process, a fork function to obtain a child process corresponding to the parent process.

In some embodiments, the parent process corresponds to multiple child processes. In this case, the startup processing associated with the application can include: startup processing jointly associated with multiple applications corresponding to the multiple child processes.

The modules described above can be implemented as software components executing on one or more general purpose processors, as hardware such as programmable logic devices and/or Application Specific Integrated Circuits designed to perform certain functions or a combination thereof. In some embodiments, the modules can be embodied by a form of software products which can be stored in a nonvolatile storage medium (such as optical disk, flash storage device, mobile hard disk, etc.), including a number of instructions for making a computer device (such as personal computers, servers, network equipment, etc.) implement the methods described in the embodiments of the present invention. The modules may be implemented on a single device or distributed across multiple devices. The functions of the modules may be merged into one another or further split into multiple sub-modules.

The methods or algorithmic steps described in light of the embodiments disclosed herein can be implemented using hardware, processor-executed software modules, or combinations of both. Software modules can be installed in random-access memory (RAM), memory, read-only memory (ROM), electrically programmable ROM, electrically erasable programmable ROM, registers, hard drives, removable disks, CD-ROM, or any other forms of storage media known in the technical field.

Figure 5:
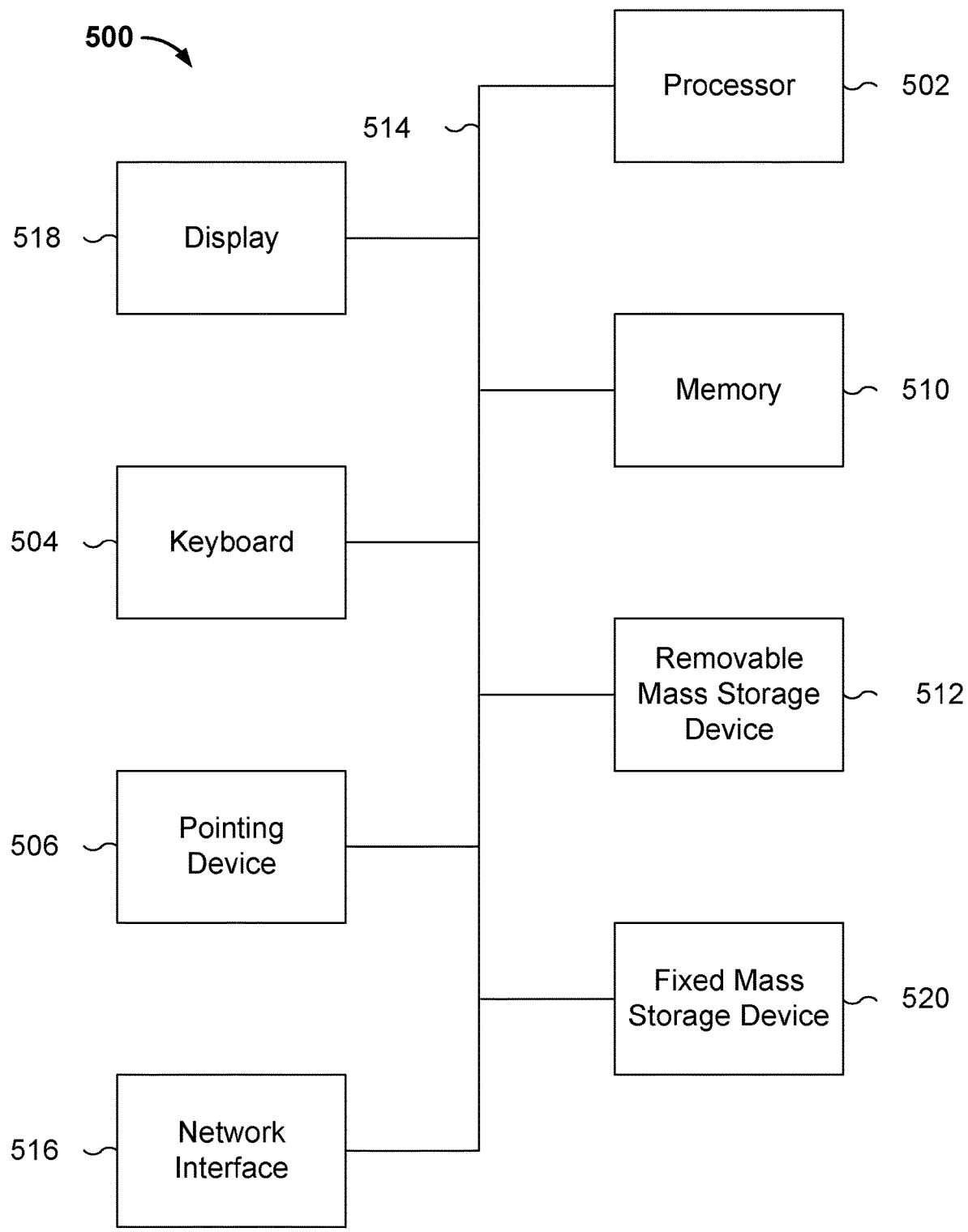
FIG. 5 is a functional diagram illustrating a programmed computer system for starting up an application in accordance with some embodiments.

FIG. 5 is a functional diagram illustrating a programmed computer system for starting up an application in accordance with some embodiments. As will be apparent, other computer system architectures and configurations can be used to start up an application. Computer system 500, which includes various subsystems as described below, includes at least one microprocessor subsystem (also referred to as a processor or a central processing unit (CPU)) 502. For example, processor 502 can be implemented by a single-chip processor or by multiple processors. In some embodiments, processor 502 is a general purpose digital processor that controls the operation of the computer system 500. Using instructions retrieved from memory 510, the processor 502 controls the reception and manipulation of input data, and the output and display of data on output devices (e.g., display 518).

Processor 502 is coupled bi-directionally with memory 510, which can include a first primary storage, typically a random access memory (RAM), and a second primary storage area, typically a read-only memory (ROM). As is well known in the art, primary storage can be used as a general storage area and as scratch-pad memory, and can also be used to store input data and processed data. Primary storage can also store programming instructions and data, in the form of data objects and text objects, in addition to other data and instructions for processes operating on processor 502. Also as is well known in the art, primary storage typically includes basic operating instructions, program code, data, and objects used by the processor 502 to perform its functions (e.g., programmed instructions). For example, memory 510 can include any suitable computer-readable storage media, described below, depending on whether, for example, data access needs to be bi-directional or uni-directional. For example, processor 502 can also directly and very rapidly retrieve and store frequently needed data in a cache memory (not shown).

A removable mass storage device 512 provides additional data storage capacity for the computer system 500, and is coupled either bi-directionally (read/write) or uni-directionally (read only) to processor 502. For example, storage 512 can also include computer-readable media such as magnetic tape, flash memory, PC-CARDS, portable mass storage devices, holographic storage devices, and other storage devices. A fixed mass storage 520 can also, for example, provide additional data storage capacity. The most common example of mass storage 520 is a hard disk drive. Mass storages 512, 520 generally store additional programming instructions, data, and the like that typically are not in active use by the processor 502. It will be appreciated that the information retained within mass storages 512 and 520 can be incorporated, if needed, in standard fashion as part of memory 510 (e.g., RAM) as virtual memory.

In addition to providing processor 502 access to storage subsystems, bus 514 can also be used to provide access to other subsystems and devices. As shown, these can include a display monitor 518, a network interface 516, a keyboard 504, and a pointing device 506, as well as an auxiliary input/output device interface, a sound card, speakers, and other subsystems as needed. For example, the pointing device 506 can be a mouse, stylus, track ball, or tablet, and is useful for interacting with a graphical user interface.

The network interface 516 allows processor 502 to be coupled to another computer, computer network, or telecommunications network using a network connection as shown. For example, through the network interface 516, the processor 502 can receive information (e.g., data objects or program instructions) from another network or output information to another network in the course of performing method/process steps. Information, often represented as a sequence of instructions to be executed on a processor, can be received from and outputted to another network. An interface card or similar device and appropriate software implemented by (e.g., executed/performed on) processor 502 can be used to connect the computer system 500 to an external network and transfer data according to standard protocols. For example, various process embodiments disclosed herein can be executed on processor 502, or can be performed across a network such as the Internet, intranet networks, or local area networks, in conjunction with a remote processor that shares a portion of the processing. Additional mass storage devices (not shown) can also be connected to processor 502 through network interface 516.

An auxiliary I/O device interface (not shown) can be used in conjunction with computer system 500. The auxiliary I/O device interface can include general and customized interfaces that allow the processor 502 to send and, more typically, receive data from other devices such as microphones, touch-sensitive displays, transducer card readers, tape readers, voice or handwriting recognizers, biometrics readers, cameras, portable mass storage devices, and other computers.

The computer system shown in FIG. 5 is but an example of a computer system suitable for use with the various embodiments disclosed herein. Other computer systems suitable for such use can include additional or fewer subsystems. In addition, bus 514 is illustrative of any interconnection scheme serving to link the subsystems. Other computer architectures having different configurations of subsystems can also be utilized.

Although the foregoing embodiments have been described in some detail for purposes of clarity of understanding, the invention is not limited to the details provided. There are many alternative ways of implementing the invention. The disclosed embodiments are illustrative and not restrictive.

What is claimed is:

1. A method, comprising:
   prior to launching an application, executing startup processing associated with the application using a parent process, comprising:
   performing one or more of the following:
   A) executing, using the parent process, a startup processing of functional modules associated with the application, wherein the functional modules include a communication module and a graphics module;
   B) executing, using the parent process, a system application programming interface (API) associated with the application, a library associated with the application, or both, wherein the system API includes querying a database, querying a kernel, or both, and wherein the library includes a class library, a standards library, a dynamic link library, or any combination thereof;
   C) establishing, using the parent process, a binding relationship between a JavaScript interface and native functional modules associated with the application, wherein the binding relationship includes converting JavaScript values to native values, calling native APIs of the native functional modules, converting native return values back to JavaScript, or any combination thereof; and/or
   D) launching a virtual machine in the parent process; and
   compiling target JavaScript code associated with the application in the virtual machine to obtain corresponding compilation results, wherein the target JavaScript code includes code of a functional module programmed using the JavaScript language, and wherein the compiling of the target JavaScript code comprises:
   analyzing the target JavaScript code associated with the application in the virtual machine to obtain a syntax tree; and
   compiling the syntax tree to obtain commands that a smart terminal is configured to recognize;
   in response to receiving a startup command for the application, creating a child process using the parent process; and
   launching the application using the child process.

2. The method as described in claim 1, wherein the creating of the child process comprises:
   in response to receiving the startup command for the application, running a fork function to obtain the child process using the parent process.

3. The method as described in claim 1, wherein:
   the parent process corresponds to a plurality of child processes; and
   the executing of the startup processing associated with the application comprises:
   executing startup processing jointly associated with a plurality of applications corresponding to the plurality of child processes.

4. The method as described in claim 1, wherein the graphics modules includes a graphical user interface (GUI) module, a rendering module, or both.

5. The method as described in claim 1, wherein prior to launching an application, the executing of the startup processing associated with the application using the parent process comprises:
   performing two or more of the following:
   A) executing, using the parent process, a startup processing of functional modules associated with the application, wherein the functional modules include a communication module and a graphics module;
   B) executing, using the parent process, a system application programming interface (API) associated with the application, a library associated with the application, or both, wherein the system API includes querying a database, querying a kernel, or both, and wherein the library includes a class library, a standards library, a dynamic link library, or any combination thereof;
   C) establishing, using the parent process, a binding relationship between a JavaScript interface and native functional modules associated with the application, wherein the binding relationship includes converting JavaScript values to native values, calling native APIs of the native functional modules, converting native return values back to JavaScript, or any combination thereof; and/or
   D) launching a virtual machine in the parent process; and
   compiling target JavaScript code associated with the application in the virtual machine to obtain corresponding compilation results, wherein the target JavaScript code includes code of a functional module programmed using the JavaScript language, and wherein the compiling of the target JavaScript code comprises:
   analyzing the target JavaScript code associated with the application in the virtual machine to obtain a syntax tree; and
   compiling the syntax tree to obtain commands that a smart terminal is configured to recognize.

6. The method as described in claim 1, wherein prior to launching an application, the executing of the startup processing associated with the application using the parent process comprises:
   performing three or more of the following:
   A) executing, using the parent process, a startup processing of functional modules associated with the application, wherein the functional modules include a communication module and a graphics module;
   B) executing, using the parent process, a system application programming interface (API) associated with the application, a library associated with the application, or both, wherein the system API includes querying a database, querying a kernel, or both, and wherein the library includes a class library, a standards library, a dynamic link library, or any combination thereof;
   C) establishing, using the parent process, a binding relationship between a JavaScript interface and native functional modules associated with the application, wherein the binding relationship includes converting JavaScript values to native values, calling native APIs of the native functional modules, converting native return values back to JavaScript, or any combination thereof; and/or
   D) launching a virtual machine in the parent process; and
   compiling target JavaScript code associated with the application in the virtual machine to obtain corresponding compilation results, wherein the target JavaScript code includes code of a functional module programmed using the JavaScript language, and wherein the compiling of the target JavaScript code comprises:
   analyzing the target JavaScript code associated with the application in the virtual machine to obtain a syntax tree; and
   compiling the syntax tree to obtain commands that a smart terminal is configured to recognize.

7. The method as described in claim 1, wherein prior to launching an application, the executing of the startup processing associated with the application using the parent process comprises:
performing the following:
A) executing, using the parent process, a startup processing of functional modules associated with the application, wherein the functional modules include a communication module and a graphics module;
B) executing, using the parent process, a system application programming interface (API) associated with the application, a library associated with the application, or both, wherein the system API includes querying a database, querying a kernel, or both, and wherein the library includes a class library, a standards library, a dynamic link library, or any combination thereof;
C) establishing, using the parent process, a binding relationship between a JavaScript interface and native functional modules associated with the application, wherein the binding relationship includes converting JavaScript values to native values, calling native APIs of the native functional modules, converting native return values back to JavaScript, or any combination thereof; and
D) launching a virtual machine in the parent process; and
compiling target JavaScript code associated with the application in the virtual machine to obtain corresponding compilation results, wherein the target JavaScript code includes code of a functional module programmed using the JavaScript language, and wherein the compiling of the target JavaScript code comprises:
analyzing the target JavaScript code associated with the application in the virtual machine to obtain a syntax tree; and
compiling the syntax tree to obtain commands that a smart terminal is configured to recognize.

8. A system, comprising:
a processor; and
a memory coupled with the processor, wherein the memory is configured to provide the processor with instructions which when executed cause the processor to:
prior to launching an application, execute startup processing associated with the application using a parent process, comprising to:
perform one or more of the following:
A) execute, using the parent process, a startup processing of functional modules associated with the application, wherein the functional modules include a communication module and a graphics module;
B) execute, using the parent process, a system application programming interface (API) associated with the application, a library associated with the application, or both, wherein the system API includes querying a database, querying a kernel, or both, and wherein the library includes a class library, a standards library, a dynamic link library, or any combination thereof;
C) establish, using the parent process, a binding relationship between a JavaScript interface and native functional modules associated with the application, wherein the binding relationship includes converting JavaScript values to native values, calling native APIs of the native functional modules, converting native return values back to JavaScript, or any combination thereof; and/or
D) launch a virtual machine in the parent process; and
compile target JavaScript code associated with the application in the virtual machine to obtain corresponding compilation results, wherein the target JavaScript code includes code of a functional module programmed using the JavaScript language, and wherein the compiling of the target JavaScript code comprises to:
analyze the target JavaScript code associated with the application in the virtual machine to obtain a syntax tree; and
compile the syntax tree to obtain commands that a smart terminal is configured to recognize;
in response to receiving a startup command for the application, create a child process using the parent process; and
launch the application using the child process.

9. A computer program product being embodied in a tangible non-transitory computer readable storage medium and comprising computer instructions for:
prior to launching an application, executing startup processing associated with the application using a parent process, comprising:
performing one or more of the following:
A) executing, using the parent process, a startup processing of functional modules associated with the application, wherein the functional modules include a communication module and a graphics module;
B) executing, using the parent process, a system application programming interface (API) associated with the application, a library associated with the application, or both, wherein the system API includes querying a database, querying a kernel, or both, and wherein the library includes a class library, a standards library, a dynamic link library, or any combination thereof;
C) establishing, using the parent process, a binding relationship between a JavaScript interface and native functional modules associated with the application, wherein the binding relationship includes converting JavaScript values to native values, calling native APIs of the native functional modules, converting native return values back to JavaScript, or any combination thereof; and/or
D) launching a virtual machine in the parent process; and
compiling target JavaScript code associated with the application in the virtual machine to obtain corresponding compilation results, wherein the target JavaScript code includes code of a functional module programmed using the JavaScript language, and wherein the compiling of the target JavaScript code comprises:
analyzing the target JavaScript code associated with the application in the virtual machine to obtain a syntax tree; and
compiling the syntax tree to obtain commands that a smart terminal is configured to recognize;
in response to receiving a startup command for the application, creating a child process using the parent process; and
launching the application using the child process.

* * * * *